(12) United States Patent
Matsumoto

(10) Patent No.: US 6,423,930 B1
(45) Date of Patent: Jul. 23, 2002

(54) SCRIBING WITH LASER

(75) Inventor: Masato Matsumoto, Osaka-fu (JP)

(73) Assignee: Mitsuboshi Diamond Industrial Co., Ltd., Osaka-fu (JP)

(*) Notice: Subject to any disclaimer, the term of this patent is extended or adjusted under 35 U.S.C. 154(b) by 0 days.

(21) Appl. No.: 09/593,928

(22) Filed: Jun. 15, 2000

(30) Foreign Application Priority Data

Jun. 18, 1999 (JP) ............................................ 11-172601

(51) Int. Cl.⁷ .............................................. B23K 26/36
(52) U.S. Cl. ...................... 219/121.69; 65/112; 83/880; 225/2
(58) Field of Search ....................... 219/121.67, 121.68, 219/121.69, 121.7, 121.71; 65/112; 83/880; 225/2

(56) References Cited

U.S. PATENT DOCUMENTS

| | | | | |
|---|---|---|---|---|
| 5,622,540 A | * | 4/1997 | Stevens | .................... 219/121.6 |
| 5,776,220 A | * | 7/1998 | Allaire et al. | ............ 219/121.6 |
| 5,826,772 A | * | 10/1998 | Ariglio et al. | ................ 225/97 |
| 5,961,852 A | * | 10/1999 | Rafla-Yuan et al. | ... 219/121.69 |

FOREIGN PATENT DOCUMENTS

WO 93/20015 10/1993

* cited by examiner

Primary Examiner—Samuel M. Heinrich
(74) Attorney, Agent, or Firm—Wenderoth, Lind & Ponack, L.L.P.

(57) ABSTRACT

When lines of vertical cracks due to thermal strain are formed for a plate made of a brittle material with a laser, the plate is irradiated with a laser beam along first lines in a first direction, and thereafter along second lines in a second direction crossing the first direction. When the second lines are scribed, depths of the generated vertical cracks are controlled to be shallower than those of the vertical cracks generated along the first lines in the first direction. The scribing is controlled by setting irradiation energy of the laser beam per unit area and per unit time in the second direction to be lower than that in the first direction. For example, moving speed of the laser spot relative to the plate is varied or output power of the laser beam is controlled on the irradiation energy.

6 Claims, 2 Drawing Sheets

SCRIBING WITH LASER

BACKGROUND OF THE INVENTION

1. Field of the Invention

The present invention relates to a method for scribing a brittle plate such as a glass plate.

2. Description of Prior Art

In a process using a glass cutter wheel for cutting a glass plate of a large size to glass plates of a predetermined smaller rectangular size, the glass plate of a large size is scribed first in a first direction, and thereafter in a second direction generally perpendicular to, and thus crossing, the first one. Then, by giving a bending stress, it is separated in a subsequent break step to provide glass plates of the smaller size. In the scribing in the second direction, in order to prevent skips around crossing points of two cutting lines in the two directions, the scribing pressure in the second direction is set higher than that in the first direction while decreasing the scribing speed.

Recently, instead of the above-mentioned scribing with a glass cutter wheel, scribing with a laser is used practically, as described in JP-A 8-509947, and vertical cracks generated with this process are blind. As shown in FIG. 1, a laser beam from a laser 2 irradiates a glass plate 1 at a laser spot 3 while the glass plate 1 is moved in a direction shown with an arrow "A". An area heated on irradiation with the laser beam is cooled next with a coolant jet 4, to change internal stress in the plate to form vertical blind cracks. Thus, blind scribing lines (lines of vertical blind cracks) 5 are generated similarly to the counterparts generated with the scriber having a glass cutter wheel. Hereinafter, blind scribe lines and vertical blind cracks are not distinguished from the counterparts generated with a glass cutter wheel, and the blind scribe lines and the vertical blind cracks are referred to as scribe lines and vertical cracks.

In the above-mentioned cross cutting using scribing with a laser beam, scribing of a glass plate is also performed first in a first direction, and then in a second direction. In the cross scribing with a glass cutter wheel, in the scribing in the second direction, as mentioned above, the scribing pressure in the second direction is set higher than that in the first direction while decreasing scribing speed, in order to generate deep vertical cracks surely, so that depths of vertical cracks become deeper. On the other hand, in the laser scribing, this process is also adopted initially, and the scribing speed on the scribing in the second direction is decreased more than that on the scribing in the first one, in order to increase irradiation energy per unit area and per unit time. When the moving speed is kept the same, the laser power in the scanning in the second direction is increased more than that in the scanning in the first one. However, when scribing with a laser is performed in the first and second directions, undesirable chippings large enough to produce defective products are generated at crossings of the scribing lines at a high probability when the glass plates are separated.

SUMMARY OF THE INVENTION

An object of the present invention is to provide a novel scribing method which prevents undesirable chippings at crossings large enough to produce defective products.

A scribing method according to the invention with a laser for forming vertical cracks due to thermal strain in a plate made of a brittle material, comprises steps of irradiating the plate with a laser beam along first lines in a first direction, and thereafter irradiating the plate with a laser beam along second lines in a second direction generally perpendicular to, and thus crossing the first direction. When the second lines are scribed for the plate, depths of the vertical cracks generated are controlled to be shallower than that of the vertical cracks generated along the first lines in the first direction. The scribing is controlled by setting irradiation energy of the laser beam per unit area and per unit time in the second direction lower than that in the first direction. For example, moving speed of the laser spot relative to the plate or output power of the laser is controlled on the irradiation energy for the plate.

An advantage of the present invention is that generation of unnecessary large chippings can be prevented in the scribing with a laser beam.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
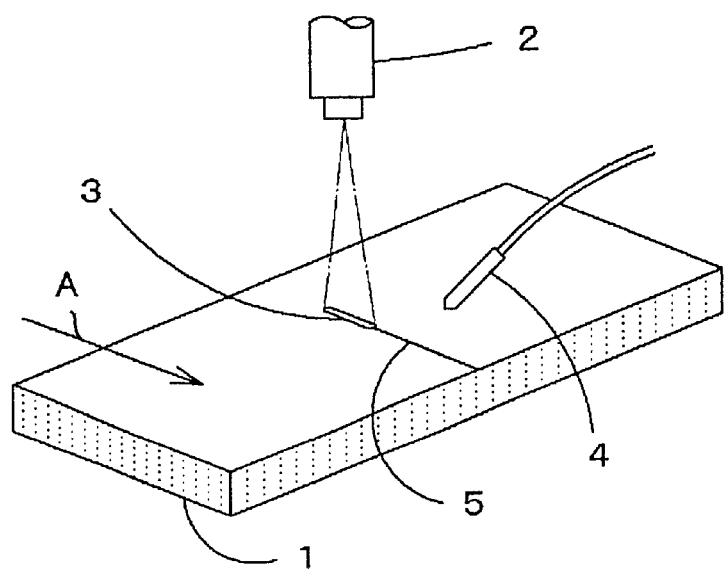
FIG. 1 is a schematic perspective view for explaining scribing with laser.

Referring now to the drawings, wherein like reference characters designate like or corresponding parts throughout the several views, FIG. 1 shows scribing of a glass plate 1 with a laser beam of a laser 2 such as a $CO_2$ laser. The laser beam irradiates the glass plate 1 at a laser spot 3, while the glass plate 1 is moved in a direction shown with an arrow "A". An area heated on irradiation with the laser beam is cooled next with a coolant jet 4, to generate change in internal stress in the plate to form vertical cracks due to thermal stress change. Thus, scribing lines (lines of vertical cracks) 5 are generated.

Figure 2:
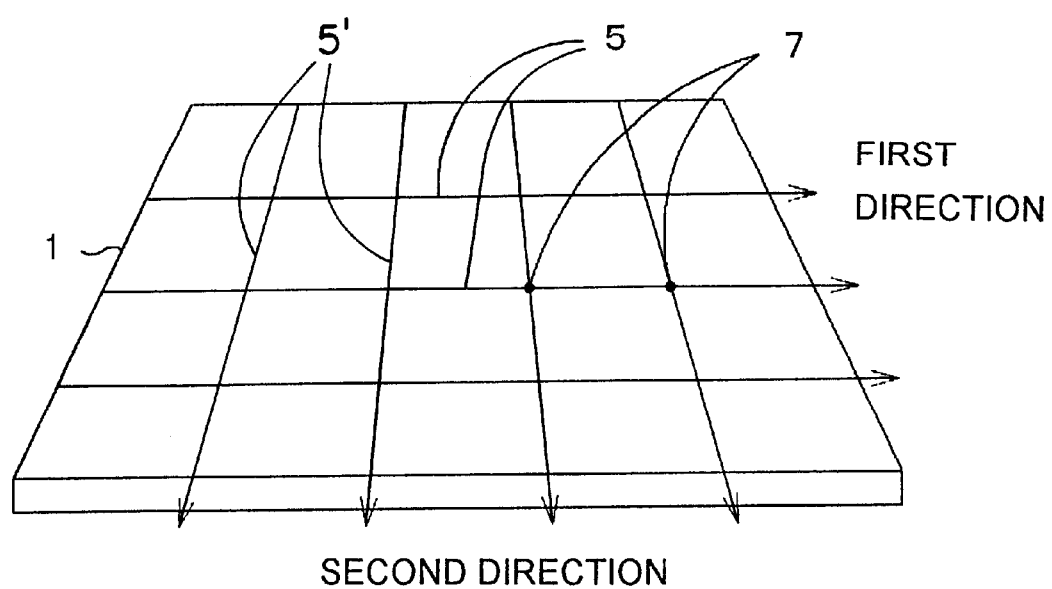
FIG. 2 is a diagram of scribing lines formed in two directions.

As shown in FIG. 2, when a glass plate 1 is scribed, scribing is performed first in a first direction (X direction). Thus, first scribing lines 5 are generated in the first direction. Next, scribing is performed in a second direction (Y direction) generally perpendicular to, and thus crossing, the first direction. Thus, second scribing lines 5' are generated in the second direction.

As will be explained below, scribing is performed in various conditions. It is found that when no anomaly occurs, depths of the vertical cracks generated along the second lines in the second direction are controlled to be shallower than that of the vertical cracks generated along the first lines in the first direction. Practically, it is found that anomaly can be suppressed by setting laser power of the laser beam per unit area and per unit time in the scribing in the second direction lower than that in the scribing in the first direction.

Scribing is performed in the three cases on conditions shown in Table 1. In the cases, the laser power of the laser 2 is kept the same at 30 W, while the moving speed of the laser spot 3 is changed.

Figure 3:
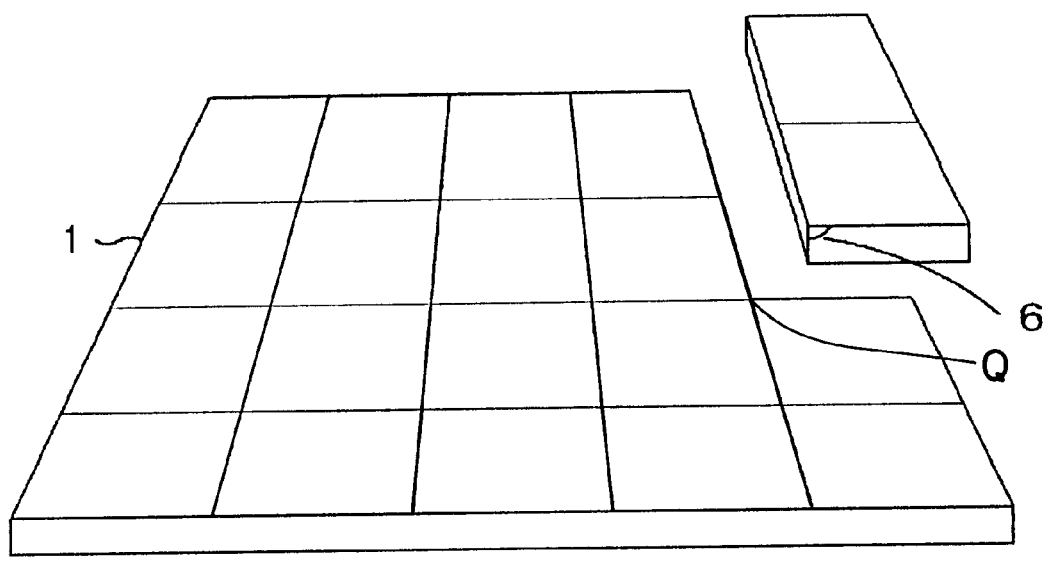
FIG. 3 is a diagram for explaining generation of anomalies.

In the first case, in the scribing in the first direction, the moving speed of the laser beam is set to be 90 mm/sec and the laser power is set to be 30 W, while in the scribing in the second direction, the moving speed is set to be 70 mm/sec and the laser power is set to be 30 W. That is, in the scribing in the second direction, the moving speed is set to be lower than that in the first one. In this case, chippings 6 large enough to produce defective goods are generated at intersections Q of the scribing lines, as shown in FIG. 3. The rate of generation of unnecessary chippings is 75% (three in four plates).

In the second case, in the scribing in the first direction, the moving speed is set to be 90 mm/sec and the laser power is set to be 30 W, while in the scribing in the second direction, the moving speed is set to be 90 mm/sec and the laser power is set to be 30 W. That is, the scribing conditions in the scribing in the second direction are the same as those in the first one. In this case, the rate of generation of unnecessary chippings is 25% (one in four plates).

Finally, in the third case, in the scribing in the first direction, the moving speed is set to be 70 mm/sec and the laser power is set to be 30 W, while in the scribing in the second direction, the moving speed is set to be 90 mm/sec and the laser power is set to be 30 W. That is, the moving speed in the scribing in the second direction is set to be higher than that in the scribing in the first direction. In this case, no anomaly is found.

TABLE 1

Scribing conditions and anomaly generation

| Case | First direction | | Second direction | | Rate of generation of anomalies |
|---|---|---|---|---|---|
| | Power (W) | Speed (mm/sec) | Power (W) | Speed (mm/sec) | |
| 1 | 30 | 90 | 30 | 70 | 75% |
| 2 | 30 | 90 | 30 | 90 | 25% |
| 3 | 30 | 70 | 30 | 90 | none |

Next, conditions shown in Table 2 are used for scribing. The moving speed of the laser spot 3 relative to the plate is kept the same, while the power of the laser 2 is changed.

In the first case, in the scribing in the first direction, the laser power is set to be 30 W and the moving speed is set to be 90 mm/sec, while in the scribing in the second direction, the laser power is set to be 40 W and the moving speed is set to be 90 mm/sec. That is, the laser power in the scribing in the second direction is higher than that in the first direction. In this case, as shown in FIG. 3, chippings 6 large enough to produce defective goods are generated at intersections Q of scribing lines. The rate of generation of the unnecessary cracks is 75% (three in four plates).

In the second case, the conditions are the same as the second case in Table 1. That is, in the scribing in the first direction, the laser power is set to be 30 W and the moving speed is set to be 90 mm/sec, while in the scribing in the second direction, the laser power is also set to be 30 W and the moving speed is also set to be 90 mm/sec. That is, the scribing conditions in the scribing in the second direction are the same as those in the first one. In this case, the rate of generation of the unnecessary chippings is 25% (one in four plates).

In the third case, in the scribing in the first direction, the laser power is set to be 30 W and the moving speed is set to be 90 mm/sec, while in the scribing in the second direction, the laser power is set to be 20 and the moving speed is set to be 90 mm/sec. That is, the laser power in the scribing in the second direction is set lower than that in the scribing in the first direction. In this case, no anomaly is found.

TABLE 2

Scribing conditions and anomalies

| Case | First direction | | Second direction | | Degree of generation of anomalies |
|---|---|---|---|---|---|
| | Power (W) | Speed (mm/sec) | Power (W) | Speed (mm/sec) | |
| 1 | 30 | 90 | 40 | 90 | 75% |
| 2 | 30 | 90 | 30 | 90 | 25% |
| 3 | 30 | 90 | 20 | 90 | none |

As will be understood from the above-mentioned examples, by controlling the output of the laser 2 and the moving speed of the laser spot 3, when irradiation energy per unit area per unit time is decreased in the scribing in the second direction than in the first one, good result of no anomaly is observed. Good result is observed generally when the output power of the laser beam in the scribing in the second direction is set to be lower by 10 to 40 percent than that in the irradiating step in the first direction, while the moving speed of the laser beam relative to the plate is kept the same. Similarly, good result is observed generally when the moving speed of the laser beam relative to the plate in the scribing in the second direction is set to be higher, e.g. 110 to 140 percent of that in the scribing in the first direction.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A scribing method with a laser for forming vertical cracks due to thermal strain in a plate made of a brittle material, comprising steps of:

irradiating the plate with a laser beam along first lines in a first direction to form vertical cracks therealong; and thereafter irradiating the plate with the laser beam along second lines in a second direction crossing the first direction to form vertical cracks therealong;

wherein depths of the vertical cracks generated along the second lines in the second direction are controlled to be shallower than those of the vertical cracks generated along the first lines in the first direction.

2. The method according to claim 1, wherein irradiation energy per unit area and per unit time of the laser beam in the irradiating step in the second direction is set to be lower than that in the irradiating step in the first direction.

3. The method according to claim 2, wherein moving speed of the laser beam relative to the plate in the irradiating step in the first direction is set to be the same as that in the irradiating step in the second direction, and out put power of the laser beam in the irradiating step in the second direction is set to be lower than that in the irradiating step in the first direction.

4. The method according to claim 3, wherein the output power of the laser beam in the irradiating step in the second direction is set to be lower by 10 to 40 percent than that in the irradiating step in the first direction.

5. The method according to claim 1, wherein the output power of the laser beam in the irradiating step in the second direction is set to be the same as that in the irradiating step in the first direction, and moving speed of the laser beam relative to the plate in the irradiating step in the second direction is set to be higher than that in the irradiating step in the first direction.

6. The method according to claim 5, wherein the moving speed of the laser beam relative to the plate in the irradiating step in the second direction is set to be 110 to 140 percent of that in the irradiating step in the first direction.

* * * * *